United States Patent
Li et al.

(10) Patent No.: US 10,983,459 B2
(45) Date of Patent: Apr. 20, 2021

(54) LIQUID ELECTROPHOTOGRAPHIC INK DEVELOPER UNIT

(71) Applicant: Hewlett-Packard Development Company, L.P., Houston, TX (US)

(72) Inventors: Guang Jin Li, San Diego, CA (US); Daniel Tanchangco, San Marcos, CA (US); Paul McCaslin, San Diego, CA (US); Anna Chin, Sr., San Diego, CA (US); Bin Huang, San Diego, CA (US); Kai-Kong Iu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/773,966

(22) PCT Filed: Jan. 27, 2016

(86) PCT No.: PCT/US2016/015115
§ 371 (c)(1),
(2) Date: May 4, 2018

(87) PCT Pub. No.: WO2017/131664
PCT Pub. Date: Aug. 3, 2017

(65) Prior Publication Data
US 2018/0321619 A1    Nov. 8, 2018

(51) Int. Cl.
*G03G 15/10* (2006.01)
*G03G 13/10* (2006.01)
(Continued)

(52) U.S. Cl.
CPC ............. *G03G 15/10* (2013.01); *G03G 13/10* (2013.01); *G03G 15/0233* (2013.01);
(Continued)

(58) Field of Classification Search
CPC .... C08L 75/04; G03G 13/10; G03G 15/0233; G03G 15/0818; G03G 15/10; G03G 15/104; G03G 2215/0861
See application file for complete search history.

(56) References Cited

U.S. PATENT DOCUMENTS

| | | | |
|---|---|---|---|
| 4,142,480 | A | 3/1979 | Schwandt et al. |
| 4,908,665 | A | 3/1990 | Takeda et al. |

(Continued)

FOREIGN PATENT DOCUMENTS

| | | |
|---|---|---|
| CN | 103176381 | 6/2013 |
| CN | 104024956 | 9/2014 |

(Continued)

OTHER PUBLICATIONS

International Search Report and Written Opinion for International Application No. PCT/US2016/015115 dated Oct. 27, 2016, 9 pages.

*Primary Examiner* — Walter L Lindsay, Jr.
*Assistant Examiner* — Geoffrey T Evans
(74) *Attorney, Agent, or Firm* — Dierker & Kavanaugh PC

(57) ABSTRACT

The present disclosure relates to a liquid electrophotographic ink developer unit. The unit comprises a developer roller comprising a layer formed from a polymer composition containing a conductive filler, whereby the polymer composition has a specific resistivity of less than $1 \times 10^6$ $\Omega \cdot$cm. The unit also comprises a secondary roller that co-operates with the developer roller.

16 Claims, 4 Drawing Sheets

(51) Int. Cl.
*C08L 75/04* (2006.01)
*G03G 15/08* (2006.01)
*G03G 15/02* (2006.01)

(52) U.S. Cl.
CPC ....... *G03G 15/0818* (2013.01); *G03G 15/104* (2013.01); *C08L 75/04* (2013.01); *G03G 2215/0861* (2013.01)

(56) References Cited

U.S. PATENT DOCUMENTS

| | | | |
|---|---|---|---|
| 5,765,084 | A | 6/1998 | Asada |
| 5,911,099 | A | 6/1999 | Nakajima et al. |
| 6,104,901 | A * | 8/2000 | Imamiya ................ G03G 15/11 399/249 |
| 6,117,557 | A | 9/2000 | Massie, II |
| 6,226,468 | B1 * | 5/2001 | Tsukamoto .......... G03G 15/101 399/55 |
| 6,256,051 | B1 | 7/2001 | Asada et al. |
| 6,451,438 | B1 | 9/2002 | Chiang et al. |
| 7,172,543 | B2 | 2/2007 | Uesaka et al. |
| 7,173,805 | B2 | 2/2007 | Lee |
| 7,445,588 | B2 | 11/2008 | Hattori et al. |
| 7,450,892 | B2 | 11/2008 | Tsubota et al. |
| 7,459,254 | B2 | 12/2008 | Yuasa et al. |
| 7,505,720 | B2 * | 3/2009 | Sugama ............. G03G 15/0818 399/279 |
| 7,639,973 | B2 | 12/2009 | Sano et al. |
| 7,981,586 | B2 | 7/2011 | Uchino et al. |
| 8,079,943 | B2 | 12/2011 | Kim |
| 8,090,295 | B2 | 1/2012 | Motokawa et al. |
| 8,396,403 | B2 | 3/2013 | Breitenbach et al. |
| 8,522,438 | B2 | 9/2013 | Gepalanarayanan et al. |
| 8,626,038 | B2 | 1/2014 | Nelson et al. |
| 8,918,035 | B2 | 12/2014 | Hasegawa et al. |
| 8,968,168 | B2 | 3/2015 | Takeuchi et al. |
| 9,046,802 | B2 | 6/2015 | Yoshida et al. |
| 2003/0097945 | A1 | 5/2003 | Lee |
| 2003/0185596 | A1 * | 10/2003 | Kellie ................. G03G 15/101 399/240 |
| 2004/0024166 | A1 | 2/2004 | Hattori et al. |
| 2005/0118421 | A1 | 6/2005 | Ashibe et al. |
| 2006/0019101 | A1 | 1/2006 | Lee |
| 2006/0165448 | A1 | 7/2006 | Yoshinaga |
| 2006/0178443 | A1 | 8/2006 | Boinowitz |
| 2007/0107225 | A1 | 5/2007 | Kim |
| 2008/0159791 | A1 | 7/2008 | Urano et al. |
| 2009/0290909 | A1 | 11/2009 | Nagami et al. |
| 2010/0155677 | A1 | 6/2010 | Beach et al. |
| 2010/0173108 | A1 * | 7/2010 | Nagao .................... C08K 3/041 428/36.9 |
| 2010/0209156 | A1 * | 8/2010 | Raz .................... G03G 15/0815 399/343 |
| 2011/0158705 | A1 | 6/2011 | Kim et al. |
| 2011/0170909 | A1 | 7/2011 | Garcia |
| 2011/0177926 | A1 | 7/2011 | Kusano |
| 2011/0206416 | A1 | 8/2011 | Berg |
| 2012/0014723 | A1 * | 1/2012 | Mizumoto ......... G03G 15/0818 399/286 |
| 2012/0027468 | A1 * | 2/2012 | Nelson .................... G03G 15/11 399/264 |
| 2012/0213542 | A1 * | 8/2012 | Tsukada ................ G03G 15/11 399/71 |
| 2013/0272755 | A1 * | 10/2013 | Takeuchi ........... G03G 15/0818 399/286 |
| 2013/0315620 | A1 | 11/2013 | Kikuchi et al. |
| 2015/0227074 | A1 | 8/2015 | Ito et al. |
| 2015/0331340 | A1 | 11/2015 | Nishioka et al. |
| 2019/0196353 | A1 | 6/2019 | Kodama |

FOREIGN PATENT DOCUMENTS

| | | |
|---|---|---|
| CN | 104204962 | 12/2014 |
| CN | 104448778 | 3/2015 |
| CN | 105093874 | 11/2015 |
| JP | 07160062 | 6/1995 |
| JP | 10231419 | 9/1998 |
| JP | 2000026719 | 1/2000 |
| JP | 2000029319 | 1/2000 |
| JP | 2003202722 | 7/2003 |
| JP | 2003248373 | 9/2003 |
| JP | 2005220317 | 8/2005 |
| JP | 2006201564 | 8/2006 |
| JP | 2007279679 | 10/2007 |
| JP | 2008033248 | 2/2008 |
| JP | 2008157980 | 7/2008 |
| JP | 2009204875 | 9/2009 |
| JP | 2010018811 | 1/2010 |
| JP | 2010134255 | 6/2010 |
| JP | 2010237445 | 10/2010 |
| JP | 2011053658 | 3/2011 |
| JP | 2012042880 | 3/2012 |
| JP | 2012107134 | 6/2012 |
| JP | 2013015716 | 1/2013 |
| JP | 2013134369 | 7/2013 |
| JP | 2014133853 | 7/2014 |
| JP | 2014209177 | 11/2014 |
| JP | 2015219365 | 12/2015 |
| JP | 2015219375 | 12/2015 |
| JP | 2015232704 | 12/2015 |
| JP | 2015232705 | 12/2015 |
| WO | WO-2010039134 | 4/2010 |
| WO | WO-2011009732 | 1/2011 |
| WO | WO-2012098590 | 7/2012 |
| WO | WO-2013151562 | 10/2013 |
| WO | WO-2015116206 | 8/2015 |

* cited by examiner

LIQUID ELECTROPHOTOGRAPHIC INK DEVELOPER UNIT

BACKGROUND

An electrophotographic printing process involves creating an image on a photoconductive surface or photo imaging plate (PIP). The image that is formed on the photoconductive surface is a latent electrostatic image having image and background areas with different potentials. When an electrophotographic ink composition containing charged ink particles is brought into contact with the selectively charged photoconductive surface, the charged ink particles adhere to the image areas of the latent image while the background areas remain clean. The image is then transferred to a print substrate (e.g. paper) either directly or by first being transferred to an intermediate transfer member (e.g. a soft swelling blanket) and then to the print substrate.

One component of a liquid electrophotographic printer is a liquid electrophotographic ink developer unit. Such a unit includes a developer roller, which is used to develop and transport a uniform layer of ink onto the photoconductive surface.

BRIEF DESCRIPTION OF THE DRAWINGS

Various implementations are described, by way of example, with reference to the accompanying drawings, in which.

DETAILED DESCRIPTION

Figure 1:
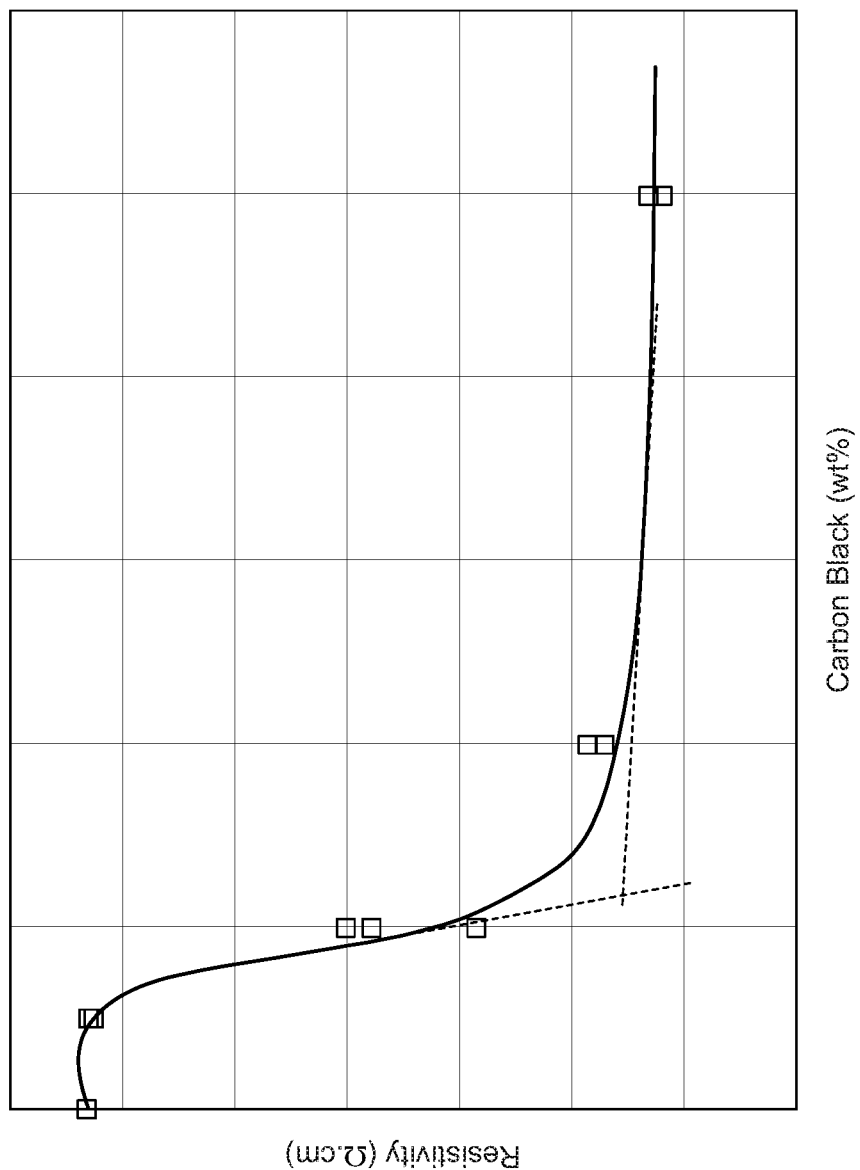
FIG. 1 is a graph showing how the log resistivity of a polymer composition varies with increasing concentrations of conductive filler.

Before the present disclosure is described, it is to be understood that this disclosure is not limited to the particular process steps and materials disclosed in this description because such process steps and materials may vary. It is also to be understood that the terminology used in this disclosure is used for the purpose of describing particular examples. The terms are not intended to be limiting because the scope is intended to be limited by the appended claims and equivalents.

It is noted that, as used in this specification and the appended claims, the singular forms "a," "an," and "the" include plural referents unless the context clearly dictates otherwise.

As used in this disclosure, "electrostatic printing" or "electrophotographic printing" refers to the process that provides an image that is transferred from a photoconductive surface or photo imaging plate either directly or indirectly via an intermediate transfer member to a print substrate. As such, the image may not be substantially absorbed into the photo imaging substrate on which it is applied. Additionally, "electrophotographic printers" or "electrostatic printers" refer to those printers capable of performing electrophotographic printing or electrostatic printing, as described above. An electrophotographic printing process may involve subjecting the electrophotographic composition to an electric field, e.g. an electric field in the range of 0.1-200V/μm, for example, 0.1 to 50V/μm.

As used in this disclosure, the term "about" is used to provide flexibility to a numerical value or range endpoint by providing that a given value or end point may be a little above or a little below the endpoint to allow for variation in test methods or apparatus. The degree of flexibility of this term can be dictated by the particular variable and would be within the knowledge of those skilled in the art to determine based on experience and the associated description in this disclosure.

As used in this disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used in this disclosure, the "dielectric constant" (ε) is the ratio of the permittivity of a substance to the permittivity of free space. "Dielectric thickness" refers to the ratio of thickness to dielectric constant (i.e. thickness÷ dielectric constant).

As used in this disclosure, "specific resistivity" or "electrical resistivity" refers to an intrinsic property that quantifies how strongly a given material opposes the flow of electric current. It may be defined as $\rho=R(A/I)$, where $\rho$ is the specific resistivity, R is the electrical resistance of the specimen, A is the contact area and I is the length or depth of the specimen. Specific resistivity may be measured using ASTM D257.

Concentrations, amounts, and other numerical data may be expressed or presented in this disclosure in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5. This same principle applies to ranges reciting a single numerical value. Furthermore, such an interpretation should apply regardless of the breadth of the range or the characteristics being described.

In the present disclosure, the term "isocyanate" is meant to be broadly understood as a functional group of atoms composed of units of the form —N=C=O (1 nitrogen, 1 carbon, 1 oxygen).

The present disclosure relates to a liquid electrophotographic ink developer unit. The unit comprises a developer roller comprising a layer formed from a polymer composition containing a conductive filler, whereby the polymer composition has a specific resistivity of less than $1\times10^6$ Ω·cm. The unit also comprises a secondary roller that co-operates with the developer roller.

The present disclosure also relates to a liquid electrophotographic printer. The printer comprises a developer roller comprising a layer formed from a polymer composition containing a conductive filler, whereby the polymer composition has a specific resistivity of less than $1 \times 10^6$ Ω·cm. The printer also comprises a secondary roller that co-operates with the developer roller.

The liquid electrophotographic ink developer unit may include an ink development zone for containing a liquid electrophotographic ink composition. The chamber may be fluidly connected to a reservoir containing a liquid electrophotographic ink composition.

In the present disclosure, a polymer composition containing a conductive filler is employed to form a developer roller. The polymer composition has a specific resistivity of less than $1 \times 10^6$ Ω·cm, for example, $1 \times 10^4$ to less than $1 \times 10^6$ Ω·cm. This contrasts with prior art polymer compositions used to form developer rollers for liquid electrophotographic ink development, which may have higher specific resistivities. As will be explained in further detail below, the specific resistivity of a developer roller may be more easily controlled by varying the concentration of conductive roller if the target resistivity is less than $1 \times 10^6$ Ω·cm, for instance, in the range of $1 \times 10^4$ to less than $1 \times 10^6$ Ω·cm than at higher resistivities. Furthermore, the conductivity of developer rollers produced according to examples of the present disclosure may be less prone to variation with time and/or environmental changes, such as temperature and humidity.

A prior art developer roller may be produced by doping a polymer roller (e.g. polyurethane) with a lithium salt. Lithium salts are effective in providing the developer roller with an electric charge effective to develop a liquid electrophotographic ink. The conductivity provided by lithium salts, however, may vary depending on environmental factors, for example, temperature and humidity. This can affect the consistency of the image produced. Moreover, over time, the lithium salt may leach out of the roller, reducing the roller's conductivity. The lithium salts may also cause parts (e.g. metal parts) of the printer to corrode. Furthermore, leached lithium ions may contact the photo-imaging plate, causing the photo-imaging plate to become conductive. If the latter occurs, it may become difficult to appropriately charge the photo-imaging plate, leading to a poorly formed latent image. This, in turn, may affect the overall quality of the final print.

The lithium salt may be replaced with a conductive filler, which may be less prone to leaching. An example of such a conductive filler is carbon black. The present inventors, however, have found that it is difficult to control the resistivity of the resulting developer roller in the region previously achieved using lithium salts (e.g. $5 \times 10^6$ to $1 \times 10^7$ Ω·cm). This is because resistivities in this region are very sensitive to filler concentrations and slight variations in the concentration of filler employed can have a large effect on the resistivity of the overall composition, particle size distribution and process parameters, such as dispersion uniformity, mould orientation, curing conditions and even flow patterns. Slight variations in these parameters can have a large effect on the resistivity of the overall composition. As a result, a developer roller having resistivities of, for example, greater than $1 \times 10^6$ Ω·cm can be difficult to produce in a reliable manner using conductive fillers, such as carbon black.

It has now been found that it is easier to control the resistivity of the developer roller if its resistivity is reduced to levels below $1 \times 10^6$ Ω·cm. For example, as can be seen in FIG. 1, the resistivity of a polymer composition changes significantly with increasing conductive filler concentrations up to a threshold concentration, T (percolation limit). Once the threshold conductive filler concentration, T, is exceeded, the resistivity of a developer roller becomes less sensitive to variations in the concentration of conductive filler. A developer roller having conductive filler concentrations exceeding its percolation limit (with a relatively low specific resistivity of less than $1 \times 10^6$ Ω·cm), therefore, may be more conveniently produced using conductive fillers than a developer roller having a relatively high specific resistivity. The conductivity of such low-resistivity developer rollers may also be more stable, for example, with time as conductive fillers may be less prone to leaching than, for example, lithium ions. The conductivity of such low-resistivity developer rollers may also be less dependent on environmental factors, such as changes in humidity. Such low-resistivity developer rollers may also be less likely to cause corrosion to, for example, metal parts in the liquid electrophotographic printer.

Developer Roller

The developer roller may have a layer formed of a polymer composition having a specific resistivity of $1 \times 10^3$ to less than $1 \times 10^6$ Ω·cm. In one example, the polymer composition has a specific resistivity of $1 \times 10^4$ Ω·cm to $5 \times 10^5$ Ω·cm. The polymer composition may have a specific resistivity of $2 \times 10^4$ Ω·cm to $3 \times 10^5$ Ω·cm, for example, $4 \times 10^4$ Ω·cm to $1 \times 10^5$ Ω·cm. In one example, the polymer composition may have a specific resistivity of $5 \times 10^4$ Ω·cm to $8 \times 10^4$ Ω·cm.

The developer roller may have a specific resistivity of $1 \times 10^3$ to less than $1 \times 10^6$ Ω·cm. In one example, the developer roller has a specific resistivity of $1 \times 10^4$ Ω·cm to $5 \times 10^5$ Ω·cm. The developer roller may have a specific resistivity of $2 \times 10^4$ Ω·cm to $3 \times 10^5$ Ω·cm, for example, $4 \times 10^4$ Ω·cm to $1 \times 10^5$ Ω·cm. In one example, the developer roller may have a specific resistivity of $5 \times 10^4$ Ω·cm to $8 \times 10^4$ Ω·cm.

In one example, the developer roller comprises a central shaft (e.g. metal) that is coated with a layer (e.g. polymer layer). The layer may coat the central shaft directly. Accordingly, the layer may be in contact with the central shaft. The layer may be outermost layer of the developer roller. The layer may be 0.1 to 3 cm thick, for example, 0.2 to 2 cm thick. In one example, the layer is 0.3 to 1 cm thick, for instance, 0.4 to 0.5 cm thick. The layer may have a specific resistivity of $1 \times 10^3$ to less than $1 \times 10^6$ Ω·cm. In one example, the layer may have a specific resistivity of $1 \times 10^4$ Ω·cm to $5 \times 10^5$ Ω·cm. The layer may have a specific resistivity of $2 \times 10^4$ Ω·cm to $3 \times 10^5$ Ω·cm, for example, $4 \times 10^4$ Ω·cm to $1 \times 10^5$ Ω·cm. In one example, the layer may have a specific resistivity of $5 \times 10^4$ Ω·cm to $8 \times 10^4$ Ω·cm. In one example, the developer roller comprises a central shaft that is coated with one or more layers. Each of the layers may have a specific resistivity of less than $1 \times 10^6$ Ω·cm, for example, $1 \times 10^3$ to less than $1 \times 10^6$ Ω·cm. The combined thickness of the layers may be 0.1 to 3 cm thick, for example, 0.2 to 2 cm. In one example, the combined thickness is 0.3 to 1 cm thick, for instance, 0.4 to 0.5 cm.

Specific resistivity is an intrinsic property that quantifies how strongly a given material opposes the flow of electric current. It may be defined as $\rho=R(A/I)$, where $\rho$ is the specific resistivity, R is the electrical resistance of the specimen, A is the contact area and I is the length or depth of the specimen. Specific resistivity may be measured using ASTM D257. In one example, the specific resistivity may be determined from a disc formed of the polymer composition used to form the developer roller having a known thickness (e.g. 2 mm). The disc may be sandwiched between 2 electrodes of a known size (e.g. 30 mm diameter). A known voltage (e.g. 100V DC) may be applied across the electrodes (e.g. for 1 second at 25 degrees C.) and the resistance measured. Specific resistivity may be calculated from the resistance measurement using the electrode contact area and disc thickness. Prior to measuring the specific resistivity of the polymer composition, the polymer composition may be conditioned at a specific humidity and temperature for a period of time. For example, the polymer composition may be conditioned at 50% humidity and 20 degrees C. for 5 days or more, for example 5 to 10 or 15 days. In one example, the polymer composition used to form the developer roller may be conditioned at 50% humidity and 20 degrees C. for 5 days.

In one example where the roller comprises a central roller shaft and a polymer coating, the specific resistivity may be determined by applying a potential difference between the surface of the roller and the central roller shaft. A known voltage (e.g. 100V DC) may be applied between the central shaft and a contact electrode on the surface of the roller (e.g. for 1 second at 25 degrees C.) and the resistance measured. Specific resistivity may be calculated from the resistance measurement using the electrode contact area and thickness of the polymer coating.

The developer roller comprises a layer formed from a polymer composition containing a conductive filler. Examples of suitable conductive fillers include carbon nanotubes, graphene, carbon fibre, carbon black, metal particles, conductive oxide particles and intrinsic conductive polymer (ICP) particles. In one example, the conductive filler is carbon black.

The conductive filler may be present at a concentration of 0.1 to 20 weight % of the polymer composition. In one example, the conductive filler may be present at a concentration of 0.1 to 5 weight %, for instance, 0.1 to 3 weight %. In one example, the amount of conductive filler (e.g. carbon black) may be 0.1 to 2 weight %, for instance, 0.5 to 1 weight % (e.g. 0.9% in weight).

By selecting types of conductive fillers and controlling the concentration of conductive filler, the developer roller with a target specific resistivity can be obtained. For example, carbon black can be categorized by its structure. Carbon black may comprise nearly spherical primary particles, which are fused together to form aggregates. The degree of aggregation of the particles is known as "structure". A carbon black with aggregates that are composed of many primary particles, such that there is considerable branching and chaining within an aggregate, is referred to as a high-structure carbon black. If an aggregate consists of relatively few primary particles, the carbon black is referred to as a low-structure black. A developer roller formulation using a high structured carbon black may reach its percolation at a lower concentration compared with a formulation using low structured carbon black.

The concentration of conductive filler may be varied or controlled to provide the developer roller with a target specific resistivity. The conductive filler may be present in the polymer resin matrix in an amount to provide the polymer composition of the developer roller with a specific resistivity of less than $1\times10^6$ Ω·cm, for example, $1\times10^4$ Ω·cm to less than $1\times10^6$ Ω·cm, for instance, $2\times10^4$ Ω·cm to $5\times10^5$ Ω·cm. The conductive filler may be present in an amount sufficient to provide the polymer composition of the developer roller with a specific resistivity of $2\times10^4$ Ω·cm to $3\times10^5$ Ω·cm, for example, $4\times10^4$ Ω·cm to $1\times10^5$ Ω·cm or $5\times10^4$ Ω·cm to $8\times10^4$ Ω·cm.

The polymer composition may comprise an elastomer. The polymer composition may include a resin matrix that consists essentially of an elastomer. Examples of suitable polymer resin materials include natural rubber, synthetic rubber, polyurethane, and epichlorohydrin (1-chloro-2,3-epoxypropane).

In one example, the polymer resin matrix of the polymer composition is formed of a polyurethane. Suitable polyurethanes may be prepared by reacting a polyol with an isocyanate compound, for example, a diisocyanate or polyisocyanate. Suitable polyols include polyester or polyether polyols. The conductive filler may be added to the polyol and/or the isocyanate compound prior to reaction with the isocyanate compound to incorporate the conductive filler into the polyurethane matrix.

In one example, the polyol may be a polyol containing a polyether functional group or a polycaprolactone polyol. Where a polyether functional group is employed, the polyol may be ethoxylated, whereby it contains a functional group having at least 2 carbon atoms between oxygen atoms. The moiety may be derived from at least one of ethylene glycol, di(ethylene glycol), tri(ethylene glycol), tetra(ethylene glycol), poly(diethylene glycol), poly(ethylene oxide) or mixtures thereof. The moiety may be present in the polyol chain or at the terminus.

As mentioned above, isocyanate compounds may be used to react with the polyol to produce the polyurethane. Isocyanate compounds may include, but are not limited to, a diisocyanate or their polymeric derivatives, such as tolulenediisocyanate, Methylene diphenyl diisocyanate (MDI), xylylenedlisocyanate, naphthylenedilsocyanate, paraphenyienediisocyanate, tetramethylxylenediisocyanate, hexamethylenediisocyanate, 4,4-dicyclohexylrnethanedilsocyanate, isophoronedlisocyanate, or tolidinediisocyanate. Examples of polymeric diphenylmethane diisocyanate (PMDI) are Mondur MR-Light or Mondur MR (Covestro®), Suitable polyols include polyester polyols containing polyester groups, for example, aliphatic polyester polyol. In one example, the polyol is a branced aliphatic polyester polyol, for example, as sold under the trademark Stepanpol® PC-505P-60 (Stepan) or Lexorez t 1100-35R (Inolex). Other examples include polyether polyols, such as polyethylene glycols sold under the trademark of Carbowax® 1000 (DOW). Other examples include polycaprolactone polyols, for example, sold under the trademark Capa 2010A® (Perstorp).

In one example, the polymer composition of the developer roller may have a Shore A hardness of 20-70, for example, 30-50. In one example, the polymer composition has a Shore A hardness of 30 to 40. The Shore A durometer may be measured according to ASTM Method D2240-86.

The polymer composition of the developer roller may be sufficiently resilient to co-operate with other rollers in the electrophotographic printer, for example, the photoconductive plate, squeegee roller and/or cleaner roller.

In one example, the developer roller is formed of a polymer composition that contains less than 5 weight % lithium salt, for example, less than 2 weight % lithium salt. In one example, the polymer composition contains less than 1 weight % lithium salt, for instance, less than 0.5 weight % or less than 0.2 weight % lithium salt. In another example, the polymer composition is substantially devoid of lithium salt.

The developer roller may comprise an inner core and an outer layer. The inner core may be made of metal or other conductive material. The inner core may be rigid enough to support the outer layer as well as interact with secondary roller(s) within an ink developer unit and/or the photoconductive surface. In one example, the inner core takes the form of a cylindrical rod. Where a metal or conductive material is used to form the inner, the metal or conductive material may be sufficiently conductive to allow charge to transfer from the inner core and into the outer layer.

The outer layer may be formed of a polymer composition as described in this disclosure. In other words, the outer layer may be formed from a polymer composition containing a conductive filler, whereby the polymer composition has a specific resistivity of $1\times10^4$ to less than $1\times10^6$ $\Omega$·cm. The polymer composition may be in direct contact with the inner core. The polymer composition may be cast, moulded or extruded onto the inner core, for example, a metal core to form the roller.

Secondary Roller

The developer roller described above may be used in combination with any suitable secondary roller. However, a developer roller having a relatively low specific resistivity may not be as capable of co-operating with metal secondary rollers to maintain an electric field appropriate for ink development due to the high electrical current. By using a secondary roller formed (i) from a material having a specific resistivity in the range of $1\times10^4$ to $1\times10^9$ $\Omega$·cm and/or (ii) with a ceramic coating, it has been found that a developer roller with a relatively low specific resistivity can be used to maintain an appropriate electric field for liquid electrophotographic ink development.

In the present disclosure, the secondary roller may be formed of a material that has a specific resistivity of $1\times10^4$ to $1\times10^9$ $\Omega$·cm, for example, $1\times10^5$ or $1\times10^6$ to $5\times10^8$. In another example, the material may have a specific resistivity of $8\times10^6$ to $2\times10^8$ $\Omega$·cm.

The secondary roller may be formed of a material having a dielectric constant ($\varepsilon$) of 1 to 50, for example, 10 to 20.

In one example, the secondary roller comprises an outer coating formed of a material having a specific resistivity of $1\times10^4$ to $1\times10^9$ $\Omega$·cm, for example, for example, $1\times10^5$ or $1\times10^6$ to $5\times10^8$. In another example, the coating may have a specific resistivity of $8\times10^6$ to $2\times10^8$ $\Omega$·cm.

The outer coating may be 2 µm to 2 mm thick. In one example, the coating may be 10 to 1000 µm thick, for example, 50 to 700 µm thick. In one example, the coating may be 100 to 500 µm thick.

The outer coating may have a dielectric thickness (thickness÷dielectric constant ($\varepsilon$)) of 5 µm or greater, for example, 5 to 200 µm.

The secondary roller may comprise a ceramic material. The ceramic material may be formed of a metal oxide or mixtures of metal oxides. The ceramic material may have a specific resistivity of $1\times10^4$ to $1\times10^9$ $\Omega$·cm, for example, $1\times10^5$ or $1\times10^6$ to $5\times10^8$. In another example, the material may have a specific resistivity of $8\times10^6$ to $2\times10^8$ $\Omega$·cm.

The resistivity of the material used to form the secondary roller can be adjusted by using a mixture of metal oxides. The ceramic material may be alumina-titania or other combinations of metal oxides. Examples of suitable metal oxides include aluminium oxides, titanium oxides, zirconium oxides, chromium oxides, yttrium oxides and hafnium oxides. Mixtures of two or more of these oxides may be employed. In one example, the ceramic material comprises alumina in an amount of 50 to 80 weight % and titania in an amount of 20 to 50 weight %.

The specific resistivity of the material used to form the secondary roller (e.g. ceramic material or metal oxide) may be determined using any suitable technique. In one example, the method according to ASTM D257 may be used. For example, the material (e.g. ceramic or metal oxide) may be formed into a disc having a known thickness (e.g. 2 mm). The disc may be sandwiched between 2 electrodes of a known size (e.g. 30 mm diameter). A known voltage (e.g. 100V DC) may be applied across the electrodes (e.g. for 1 second at 25 degrees C.) and the resistance measured. Specific resistivity may be calculated from the resistance measurement using the electrode contact area and disc thickness.

In one example, the secondary roller comprises an inner core, for instance, formed of metal. The core may take the form of a metal cylinder. The metal cylinder may function as the roller shaft. The metal core may be coated with a material. The coating (e.g. outermost coating) may have a target specific resistivity. In one example, the secondary roller comprises a core (e.g. a metal core) that is coated (e.g. as outermost coating) with a ceramic material, such as alumina-titania, or a metal oxide (e.g. as described above). The coating may be applied, for example, by plasma spraying. The coating may be 20 to 1000 µm thick, for example, 50 to 700 µm thick. In one example, the coating may be 100 to 500 µm thick, for instance 200 to 400 µm thick.

The secondary roller may comprise a squeegee roller. A squeegee roller may be used to remove any excess solvent (e.g. an organic solvent, for instance, iso-paraffin oil) away from any liquid electrophotographic composition on the developer roller. Depending on the charge of the ink particles, the squeegee roller may be more or less negatively charged relative to the developer roller. In use, as the squeegee roller may come into contact with the developer roller. The ink layer on the developer roller may become more concentrated as pressure is applied to the ink layer by the squeegee roller to remove solvent (e.g. organic solvent) from the surface of the developer roller. This is sometimes referred to as "compaction". In one example, the squeegee roller may help to develop the ink layer and remove enough solvent from the ink such that the particle concentration is increased.

The secondary roller may additionally or alternatively comprise a cleaner roller. A cleaner roller may be used to remove excess ink from the developer roller after the bulk of the ink has been transferred to the photo-imaging plate. The cleaner roller may have a different charge bias compared to the developer roller so that charged ink particles on the developer roller may be attracted to the cleaner roller and thereby removed from the developer roller.

In one example, the secondary roller may comprise more than one roller. In one example, the secondary roller comprises two or more rollers (e.g. a squeegee roller and a cleaner roller). Each secondary roller may comprise a material having a specific resistivity of $1\times10^4$ to $1\times10^9$ $\Omega$·cm. All secondary rollers that co-operate with the developer roller may have the same or substantially the same specific resistivity.

Ink Developer Unit

Figure 2:
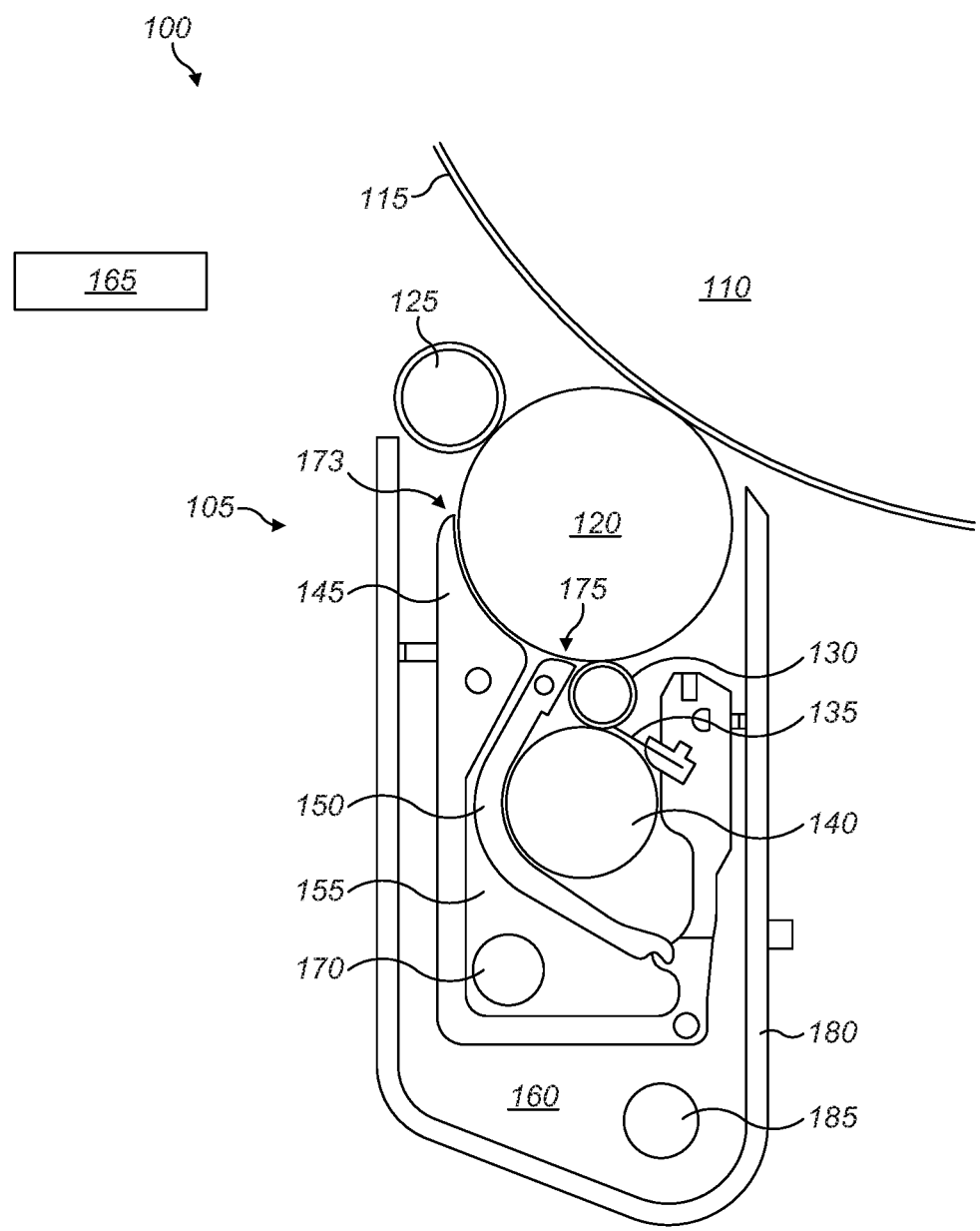
FIG. 2 is a cross-sectional diagram of a binary image development unit according to one example of the liquid electrophotographic ink developer unit described in this disclosure.

FIG. 2 is a cross-sectional diagram of an example of an ink development unit. In this example, the ink development unit is a binary image development unit (105). The binary image development unit (105) comprises a developer roller (120). The binary image development unit (105) may also comprise a number of other static parts and rollers which cooperate with the developer roller (120) to transport an amount of ink from the binary image development unit (105) to the photo imaging plate (115) on the photo imaging drum (110). A binary image development unit (105) as shown in FIG. 2 may be included within a liquid electrophotographic printer (100). The liquid electrophotographic printer (100)

may include any number of binary image development units (105) as needed, each unit (105) containing a different colour or type of ink with which to apply to the photo imaging plate (115). An example of such a system (100) can be found within some of the INDIGO® digital presses manufactured by Hewlett-Packard Company. Additionally, an example of an ink that may be used within the binary image development unit (105) may be an ink containing charged pigmented particles in a liquid carrier developed and manufactured by Hewlett-Packard Company under the trademark Electroink®.

In addition to the developer roller (120), the binary image development unit (105) may include a back electrode (150), a main electrode (145), a squeegee roller (125), a cleaner roller (130), a wiper blade (135), a sponge roller (140), an ink chamber (155), an ink reservoir (160), an ink inlet (170), and an ink outlet (185). The liquid electrophotographic printer(100) therefore may include the binary image development unit (105) mentioned above as well as a photo imaging plate (115) coupled to a photo imaging drum (110) and an imager (165). Each of these will now be discussed in more detail.

The binary image development unit (105) selectively coats the photo imaging plate (115) with an amount of ink. To accomplish this, separate ink tanks may be used to hold and control the desired properties of the ink such as the ink's density and conductivity. One ink tank may be used for each colour. In an idle stage, for example, before printing starts, the binary image development unit (105) may be empty (i.e. devoid of ink). To start developing ink, the binary image development unit (105) may be provided with a flow of ink pumped from ink tanks (not shown) through the ink inlet (170) that allows a continuous supply of ink in the development area or zone, i.e., the gaps (173, 175) between developer roller (120) and electrodes (150, 145). As mentioned earlier, the ink may be positively or negatively charged. For purposes of simplicity in illustration, the ink within the binary image development unit (105) in FIG. 2 is described as if it is negatively charged. Still further the ink may contain varying amounts of solids within the ink solution. In one example, the ink may be comprised of 2-3% solids.

As the ink is pumped into the ink chamber (155) via the ink inlet (170), two electrodes, a main electrode (145) and a back electrode (150), apply an electric field across two gaps (173, 175). A first gap (173) is located between the main electrode (145) and the developer roller (120), and a second gap (175) is located between the back electrode (150) and the developer roller (120). The electric charge across these gaps (173, 175) causes the ink particles to be attracted to the more positively charged developer roller (120).

The developer roller (120) may be made of a polyurethane material with an amount of conductive filler, for example, carbon black mixed into the material. As discussed above, this may give the developer roller (120) the ability to hold a specific charge having a higher or lower negative charge compared to the other rollers (125, 110, 130) with which the developer roller (120) directly interacts. As discussed above, the developer roller (120) may contain sufficient conductive filler, whereby the roller (120) has a specific resistivity of less than $1 \times 10^6$ Ω·cm, for example, $5 \times 10^4$ to $1 \times 10^5$ Ω·cm.

In one example, the electrical bias between the electrodes (145, 150) and the developer roller (120) produces an electric field between the electrodes (145, 150) and the developer roller that is about 800-1000 volts. With a gap (173, 175) of about 400-500 µm, the electric field becomes relatively high and the negatively charged ink particles are attracted to the developer roller (120). This creates a layer of ink over the developer roller (120).

As the ink particles are built up on the developer roller (120), a squeegee roller (125) may be used to squeeze the top layer of oil away from the ink. The squeegee roller (125) may also develop some of the ink onto the developer roller (120). In order to accomplish these two objectives, the squeegee roller (125) may be both more negatively charged relative to the developer roller (120) and may abut the developer roller (120) creating a nip. As the squeegee roller (125) comes in contact with the developer roller (120), the ink layer on the developer roller (120) may become more concentrated. In one example, the squeegee roller (125) may develop the ink layer and remove enough oil or organic solvent from the ink such that the particle concentration is increased. In one example, the resulting ink concentration may be around 20% to 25% colorant concentration.

After the ink on the developer roller (120) has been further developed and concentrated by the squeegee roller (125), the ink may be transferred to the photoconductive photo imaging plate (115). In one example, the photo imaging plate (115) may be coupled to a photo imaging drum (110). In another example, the photo imaging drum (110) may incorporate the photo imaging plate (115) such that the photo imaging drum (110) and photo imaging plate (115) are a single piece of photoconductive material. However, for the purposes of simplicity in illustration, the photo imaging plate (115) and photo imaging drum (110) are separate pieces thereby allowing the photo imaging plate to be selectively removed from the photo imaging drum (110) for replacement if needed.

In one example, prior to transfer of ink from the developer roller (120) to the photo imaging plate (115), the photo imaging plate or, alternatively, the photo imaging drum (110) and plate (115), may be negatively charged with a charge roller. A latent image may, therefore, be developed on the photo imaging plate (115) by selectively discharging selected portions of the photo imaging plate (115) with, for example, a laser (165). The discharged area on photo imaging plate (115) may now be more positive as compared with developer roller (120), while the charged area of photo imaging plate (115) may still relatively be more negative as compared with developer roller (120). When the developer roller (120) comes in contact with the photo imaging plate (120) the negatively charged ink particles may be attracted to the discharged areas on the photo imaging plate (115) while being repelled from the still negatively charged portions thereon. This can create an image on the photo imaging plate (115) which may then be transferred to another intermediate drum or directly to a sheet of media such as a piece of paper.

Because a portion of the ink is transferred from the developer roller (120) to the photo imaging plate (115), the excess ink may be removed from the developer roller (120) using a cleaner roller (130). The cleaner roller (130) may have a more positive bias compared to the developer roller (120). As such, the negatively charged ink particles may be attracted to the cleaner roller (130) and thereby removed from the developer roller (120). A wiper blade (135) and sponge roller (140) may subsequently remove the ink from the cleaner roller (130).

The developer roller (120) may be compliant with the other rollers with which it interacts; namely the squeegee roller (125), the cleaner roller (130), and the photo imaging plate (115) and drum (110). These rollers (125, 130) and the photo imaging plate (115) may be made of hard materials such as metal. Therefore, the developer roller (120) may be made of a material that has a low hardness value compared to these other rollers (125, 130), the photo imaging plate (115), and the photo imaging drum (110).

As discussed above, the squeegee roller (125) and/or cleaner roller (130) may be formed from a ceramic material. For example, the squeegee and/or cleaner roller may be formed with a metal core that is coated with a ceramic (e.g. alumina/titania), for instance, by plasma spraying.

The developer roller may be at a different bias against the electrodes or secondary roller(s). The difference may be 0 to 1200V. The resistance along a one-meter length of contact nip between the developer roller or any secondary roller may be $3 \times 10^2$ Ohm to $3 \times 10^5$ Ohm or $3.3 \times 10^2$ Ohm to $3.3 \times 10^5$ Ohm, for example, $1.3 \times 10^4$ Ohm to $3 \times 10^5$ Ohm.

EXAMPLES

Example 1

In this example, developer rollers produced using the formulation shown in Table 1. The formulation contained carbon black in a concentration below the percolation limit.

99.8 grams of a branched aliphatic polyester polyol (Stepanpol® PC-505P-60 (Stepan Company)) was mixed with 0.2 gram of Ketjenblack EC-600JD Powder (AkzoNobel) and other additives through a high shear mixer. The mixture was then degassed at 90 degrees C. and 635 torr vacuum for 16 hours. The mixture temperature was increased to 105 degrees C. 10.7 g polymeric isocyanates based on diphenyl methane diisocyanate (Mondur® MR light supplied by Covestro®) were added and the mixture was mixed using a dual asymmetric centrifugal mixer for 3 minutes. The final liquid was then poured into a tube-type casting mould with a metal developer roller core positioned inside. The composition was cured at temperatures about 120 degrees C. for 3 hours before demoulding. The resulting rollers were then conditioned at 50% humidity and 20 degrees C. for more than 5 days before specific resistivities of the rollers were determined. The specific resistivities of the rollers from this process ranged from greater than $1.0 \times 10^6$-$1.0 \times 10^7$ $\Omega \cdot$cm. Thus, the variation in resistivity between rollers was significant even when the rollers were made using the same formulation from the same batch. Variations in resistivity within each roller were also found to be significant, with variations as high as 600% between regions of low and high resistivity within the same roller. The variations within each roller either resulted in rollers that failed to print or that produced poor quality images due to inconsistencies in ink transfer arising from the variations in resistivities within the roller.

TABLE 1

Formulation of a developer roller formulation with carbon black concentration below percolation limit.

| Components | Materials | Amount (grams) |
|---|---|---|
| Polyol | Stepanpol PC-505P-60 | 99.8 |
| Isocyanate | Mondur MR light | 10.7 |
| Conductive filler | Ketjenblack EC-600JD Powder | 0.2 |
| Other additives | Other additives | <4.0 |
| Hardness | | 34-38 shore A |

Example 2

In this example, developer rollers were produced with the formulation shown in Table 2 with a carbon black loadings exceeding the percolation limit. The rollers were prepared as described in relation to Example 1. The resistivity of rollers from this process was measured to have specific resistivities of 8-24 K$\Omega \cdot$cm. The variation in resistivity between rollers from the same batch was significantly less than in Example 1.

TABLE 2

Formulation of a developer roller formulation with carbon black concentration exceeding percolation limit

| Components | Materials | Amount (grams) |
|---|---|---|
| Polyol | Stepanpol PC-505P-60 | 99.8 |
| Isocyanate | Mondur MR light | 9.9 |
| Conductive filler | Ketjenblack EC-600JD Powder | 1.0 |
| Other additives | Other additives | <4.0 |
| Hardness | | 34-38 shore A |

Example 3

In this example, surfaces of steel rollers were roughened by sand blasting for better adhesion. Mixtures of fine powders of alumina and titania in the ratio shown in Table 3 were applied on roller surfaces with a plasma spray gun. Coating thickness was controlled by process parameters such as powder feeding rate or coating time. Shafts were masked during the process to maintain their critical dimensions and good electrical contact. Rollers were further processed by grinding after coating to meet the dimensional and surface roughness requirements. The specific resistivities of the coatings ranged from $3 \times 10^6$ Ohm·cm to $4 \times 10^7$ Ohm·cm.

TABLE 3

| Roller | Alumina (wt %) | Titania (wt %) | Thickness (microns) | Dielectric thickness (microns) |
|---|---|---|---|---|
| A | 60 | 40 | 100 | 6.7 |
| B | 60 | 40 | 200 | 13 |
| C | 73.5 | 26.5 | 100 | 6.7 |
| D | 73.5 | 26.5 | 200 | 13 |
| E | 75 | 25 | 400 | 27 |

Example 4

A binary ink development unit was built with a developer roller from Example 2 and uncoated metal secondary rollers (for both squeegee and cleaner roller). The BID was then tested on HP Indigo 7000 digital press. The printing trial was not successful because the printer could not calibrate the optical density of ink on media. A further investigation revealed the failure was due to power supply over-current due to the very low resistance at the nips between developer roller and secondary metal rollers. In this example, the nip current was 300 volts/1 kohms=0.33 A, which was beyond the power supply capacity.

Example 5

Example 4 was repeated but the uncoated metal secondary rollers were replaced with the ceramic-coated roller B of Example 3 (see Table 3). The BID still failed colour calibration due to over current at nominal voltages, but successfully printed when reducing the electrical bias between developer roller and secondary rollers from 325 volts to 250 volts.

Example 6

Example 4 was repeated but the uncoated metal secondary rollers were replaced with the ceramic-coated roller C of Example 3 (see Table 3). This BID successfully printed with nominal printing conditions without any errors.

Example 7

Figure 3:
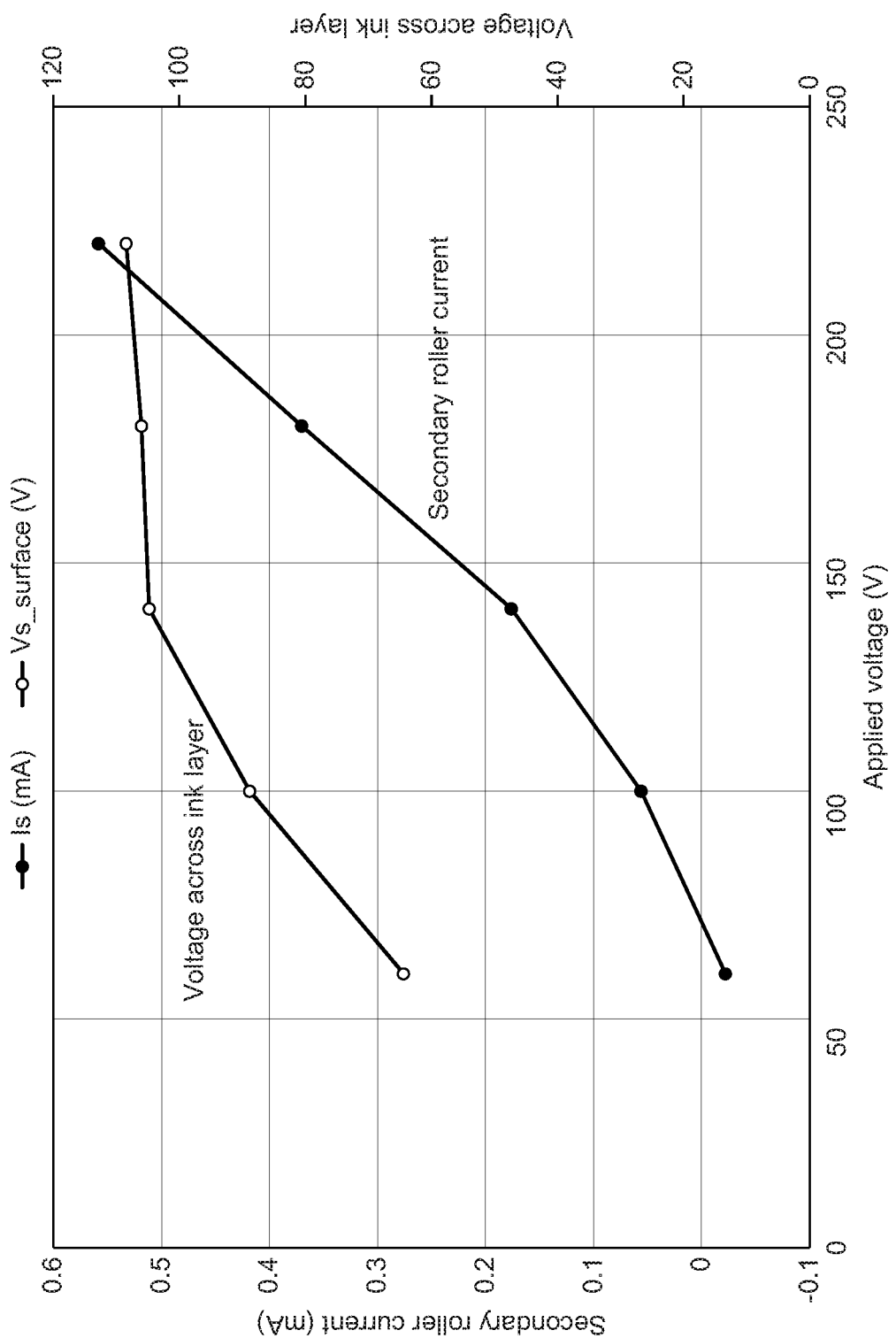
FIG. 3 is a graph showing how voltage and current across the ink layer varies with increasing applied voltage in Example 7.

A developer roller formed using a nitrile rubber composition containing carbon black (specific resistivity of composition=$5\times10^4$ Ohm·cm) was used in combination with an uncoated metal secondary roller. A 200 kΩ resistor was placed in series with metal secondary roller in order to increase the resistance of the secondary roller circuit. FIG. 3 shows how the voltage and current across the ink layer varies with applied voltage. Both the voltage and current across the ink layer increases linearly up to an applied voltage of approximately 140V. At higher voltages, the current increases at a much higher rate, indicative of breakdown. The voltage across the ink layer begins to plateau. Thus, increases in applied voltage no longer result in corresponding increases in the electric field, making it more difficult to control the electric field at higher applied voltages.

Example 8

Figure 4:
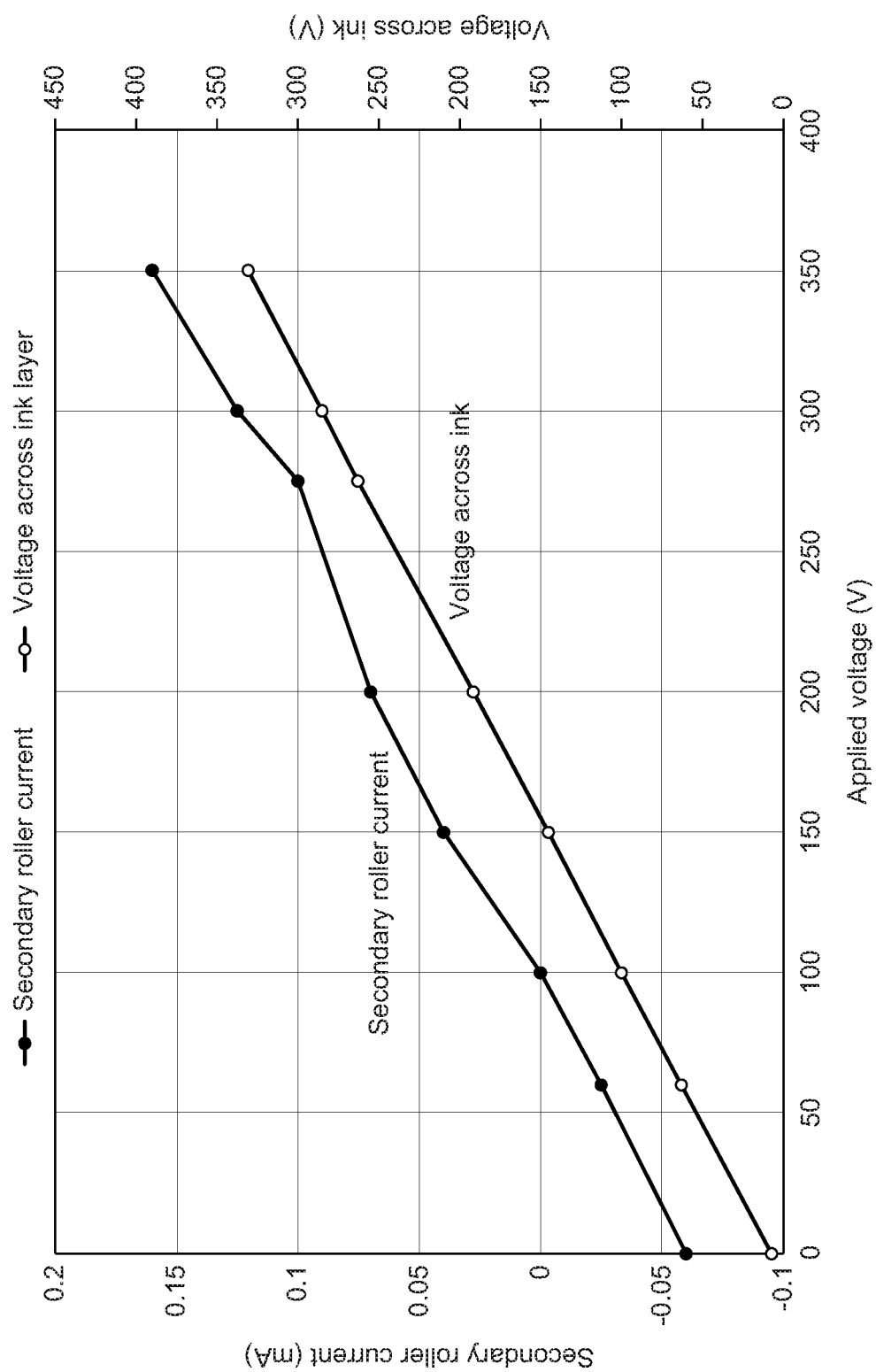
FIG. 4 is a graph showing how voltage and current across the ink layer varies with increasing applied voltage in Example 8.

A developer roller formed using a nitrile rubber composition containing carbon black (specific resistivity of composition=$5\times10^4$ Ohm·cm) was used in combination with the ceramic-coated roller E of Example 3 (Table 3). FIG. 4 shows how the voltage and current across the ink layer varies with applied voltage. Both the voltage and current across the ink layer increase linearly up to an applied voltage of approximately 350V. There were no signs of breakdown and both current and voltage could be controlled by increasing the applied voltage.

The invention claimed is:

1. A liquid electrophotographic ink developer unit, comprising:
a stable-conductivity, uniform-resistivity developer roller comprising a layer formed from a polymer composition containing a conductive filler, whereby the polymer composition has a specific resistivity of less than $1\times10^6$ Ω·cm, and
a secondary roller that co-operates with the stable-conductivity, uniform-resistivity developer roller;
wherein the nip resistance between the stable-conductivity, uniform-resistivity developer roller and the secondary roller is $3\times10^2$ Ohm to $3\times10^5$ Ohm.

2. The unit as claimed in claim 1, wherein the polymer composition has a specific resistivity of $1\times10^3$ Ω·cm to $1\times10^5$ Ω·cm.

3. The unit as claimed in claim 1, wherein the conductive filler is selected from graphene, carbon fibre, carbon black, metal particles, conductive oxide particles and intrinsic conductive polymer (ICP) particles.

4. The unit as claimed in claim 3, wherein the conductive filler is carbon black.

5. The unit as claimed in claim 4, wherein the concentration of carbon black in the polymer composition is 0.1 to 20 weight %.

6. The unit as claimed in claim 1, wherein the polymer composition comprises a polymer resin matrix formed from a polyurethane.

7. The unit as claimed in claim 1, wherein the secondary roller is formed from a material having a specific resistivity of $1\times10^4$ to $1\times10^9$ Ω·cm.

8. The unit as claimed in claim 1, which comprises two secondary rollers.

9. The unit as claimed in claim 1, wherein the secondary roller comprises a ceramic material.

10. The unit as claimed in claim 9, wherein the ceramic material is alumina-titania.

11. The unit as claimed in claim 1, wherein the secondary roller comprises a metal core that is coated with a coating.

12. The unit as claimed in claim 11, wherein the coating is a ceramic coating.

13. The unit as claimed in claim 12, wherein the coating has a specific resistivity of $5\times10^6$ to $4\times10^8$ Ω·cm and a thickness of 20 μm to 2 mm.

14. The unit as claimed in claim 1, wherein the polymer composition has a specific resistivity of less than $1\times10^3$ Ω·cm.

15. The unit as claimed in claim 1, wherein the polymer composition has a Shore A hardness of 20 to 70.

16. A liquid electrophotographic printer, comprising:
a stable-conductivity, uniform resistivity developer roller comprising a layer formed from a polymer composition containing a conductive filler, whereby the polymer composition has a specific resistivity of less than $1\times10^6$ Ω·cm, and
a secondary roller that co-operates with the stable-conductivity, uniform-resistivity developer roller;
wherein the nip resistance between the stable-conductivity, uniform-resistivity developer roller and the secondary roller is $3\times10^2$ Ohm to $3\times10^5$ Ohm.

* * * * *